Oct. 21, 1952 C. W. JENNINGS 2,614,476
OBSTRUCTION RESPONSIVE ROOT CUTTING PLOW
Filed May 5, 1949 3 Sheets-Sheet 1
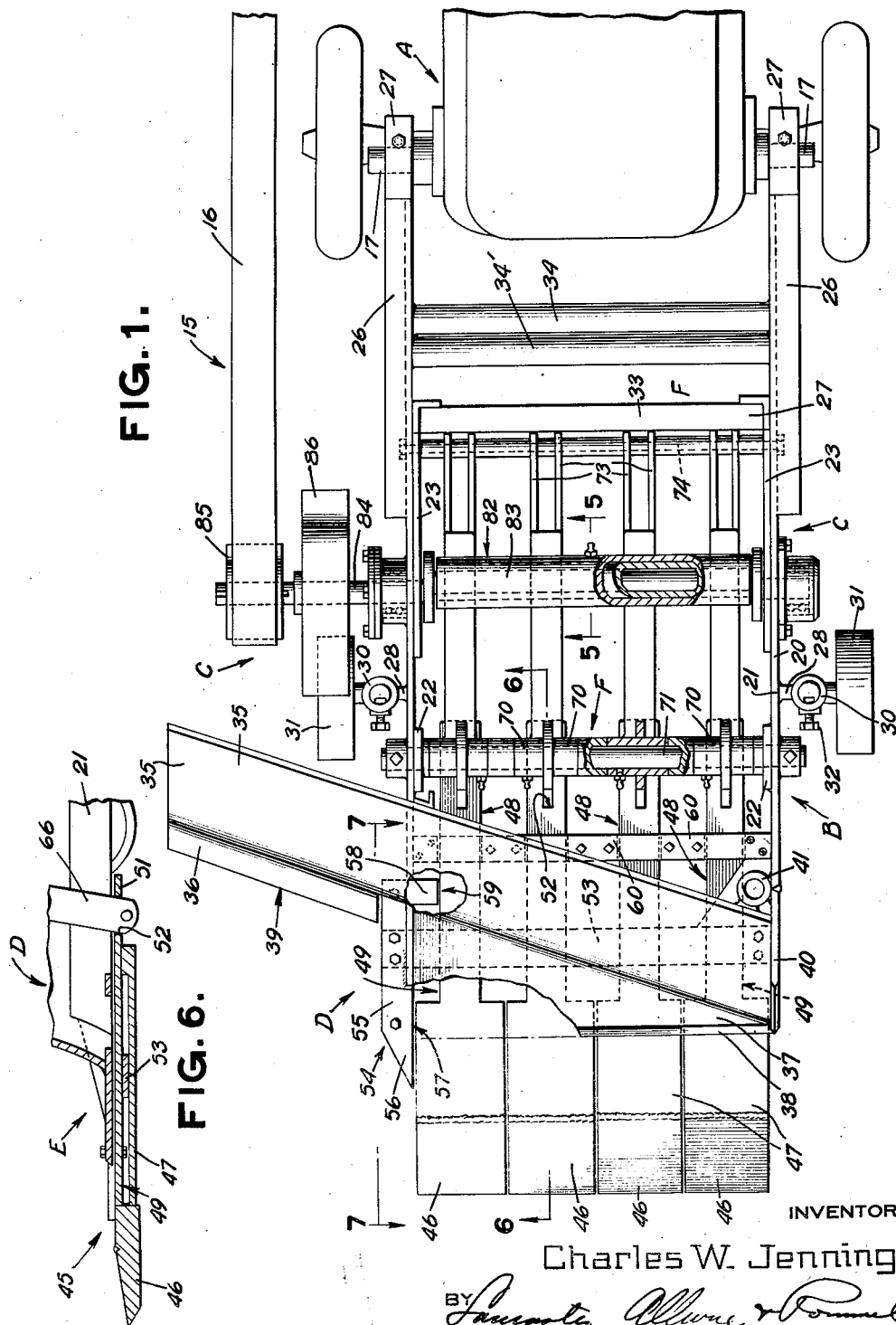
INVENTOR.
Charles W. Jennings
BY
ATTORNEYS.

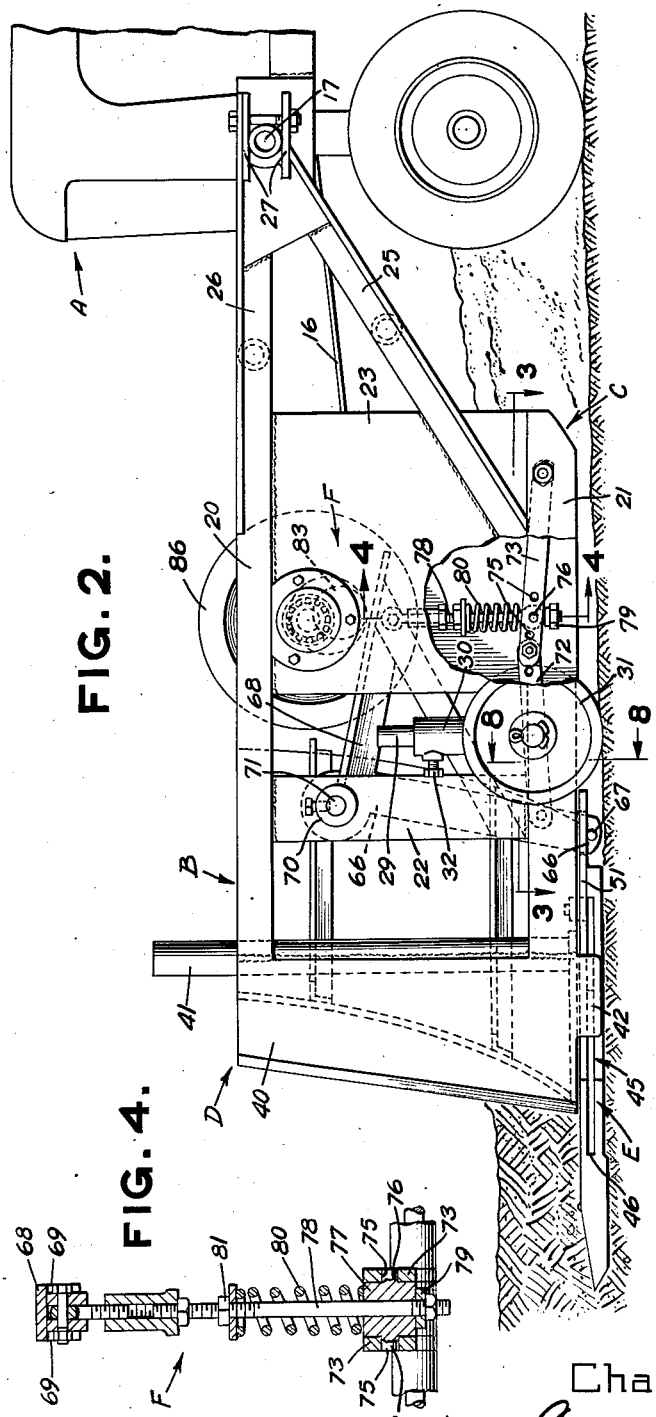

Oct. 21, 1952      C. W. JENNINGS      2,614,476

OBSTRUCTION RESPONSIVE ROOT CUTTING PLOW

Filed May 5, 1949      3 Sheets-Sheet 3

INVENTOR.
Charles W. Jennings
BY *Lancaster, Allwine & Rommel*
ATTORNEYS.

Patented Oct. 21, 1952

2,614,476

UNITED STATES PATENT OFFICE 2,614,476

OBSTRUCTION RESPONSIVE ROOT CUTTING PLOW

Charles Wendell Jennings, Ballinger, Tex.

Application May 5, 1949, Serial No. 91,503

9 Claims. (Cl. 97—226.1)

This invention relates to plows and more particularly to so-called root cutting plows.

An important object of the invention is to provide a plow of this kind which will sever roots and stumps, such as the underground portions thereof, in an efficient manner so that the debris will not accumulate on the plow nor immediately in front of it, and the plow will not be forced, during the cutting or severing operations, out of the ground.

It has been discovered that one of the defects of many root-cutting plows is that there is provided no mechanism-actuating means sufficiently powerful to actually cut into and finally sever the roots and stumps.

An important object of this invention is to provide a plow including a cam-actuated root-cutting mechanism which will positively and cleanly cut into and sever roots and stumps.

Still another important object is to provide a plow with mechanism as described and powerful enough to break up most stones and rock encountered in the path of travel of the plow.

In order to reduce wear and tear, a cutting mechanism or means is provided associated with means which is constructed and arranged to set the mechanism in operation only when an obstruction, as a root, stump, stone, rock, hard clod or the like is encountered. That is the mechanism will not operate during ordinary plowing operations but, when such obstructions are encountered, the cutting mechanism will be thrown automatically into instant operation and will continue in operation until the obstruction is severed or broken up, whereupon operation of the mechanism will be stopped.

A further important object is to provide a particularly quick-acting and sturdy feeler structure which will set the cutting mechanism actuating means into operation and which feeler structure also forms a part of the actual cutting mechanism, thus reducing the number of parts of the new cutting mechannism.

It has been discovered that this new plow will not side slip when an obstruction is encountered and is so constructed that, after the roots and stumps are severed and the stone and rock broken up, the debris will be brought to the surface of the ground and carried to one side of the plow.

Other objects and advantages of the invention will be apparent during the course of the following detailed description of the invention, taken in connection with the accompanying drawings, forming a part of this disclosure, and in which drawings:

Figure 1 is a top plan of the new plow, with the exception of a small portion which is in horizontal section in order to show certain interior structure.

Figure 2 is a view, mostly in side elevation of the same, with several minor parts broken away in order to illustrate mechanism therebeneath.

Figure 3 is a horizontal longitudinal section, substantially on the line 3—3 of Figure 2.

Figure 4 is a vertical transverse section substantially on the line 4—4 of Figure 2.

Figure 5 is a vertical longitudinal section substantially on the line 5—5 of Figure 1.

Figure 6 is a vertical longitudinal section of the forward portion of the cutting mechanism, substantially on the line 6—6 of Figure 1.

Figure 9:
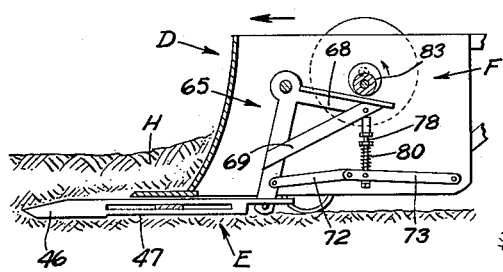

Figures 9 to 13 inclusive are vertical longitudinal sections, somewhat along the lines of Figure 6, but on reduced scales, illustrating steps in the severing of an obstruction.

In the drawings wherein for the purpose of illustration is shown a preferred embodiment of the invention and wherein similar reference characters designate corresponding parts throughout the several views, the letter A designates a wheeled vehicle and B, a plow structure which comprises a frame or support C, a plow D, the new cutting mechanism E which also provides a feeler means and a cutting mechanism actuating means F. The letter G designates an obstruction in the path of travel of the vehicle A and plow structure B, and disposed partly beneath the surface of the ground H.

The wheeled vehicle A is shown, by way of example, as a conventional tractor, and may be provided with a power take-off, designated generally as 15, including a belt 16, and with a pair of rigid, horizontally-disposed spindles 17 extending transversely of the body of the vehicle A from opposite sides thereof, and forming parts of hitch means to be described.

The plow structure B includes a frame or support C which is preferably made up of upper and lower side frame members 20 and 21 respectively, connected by vertically-disposed facing side panels 22 and 23 and horizontal cross braces 33. To suitable portions, as the lower side frame members 21 and side panels 23, may be secured, as by welding, upwardly and rearwardly extending tractor hitch portions 25 associated with horizontally-disposed and rearwardly extending tractor hitch portions 26, the forward sections of which may be welded to the upper side frame members 20 and the rearward sections joined, also by welding to conventional separable coupling sections 27 which may be clamped around the spindles 17 thus forming a pair of tractor hitches. With this construction there will be no appreciable lateral movement of the plow structure B independently of the vehicle A. Extending outwardly from each lower side frame member 21 is a substantially L-shaped ground wheel support 28 with the longitudinal portions thereof secured, as by welding to the frame members 21. The vertical portions 29 telescopically carry vertically-disposed tubular members 30 with a suitable spindle extending laterally from each and mounting a ground wheel 31. Means 32 to adjustably retain the tubular members upon these vertical portions 29 of the supports 28 may be set screws carried by the tubular members 30 and bearing against the vertical portions 29. Cross braces 33 connect the frame members, and cross braces 34 and 34' connect the hitch portions 25 and 26 respectively.

This plow structure B also includes a plow D which is adapted specifically for association with the mechanism or means E. This plow comprises an upwardly-extending body portion 35 extending across the frame C at the forward end thereof. This body portion 35 is inclined transversely upwardly and rearwardly and inclined longitudinally with reference to the line of draft, or longitudinal axis of the frame C. It will be noted, in Figure 2 that, at the most rearwardly inclined end section of the plow, there is provided a substantially horizontal, forwardly-extending, minor offset portion 36 and at the most forwardly and intermediate end sections of the plow, there is a substantially horizontal, forwardly-extending major offset portion 37. The forward edge 38 of the portion 37 is normal to the longitudinal axis of the plow structure B (that is normal to the line of draft) while the forward edge 39 of the portion 36 is inclined to this axis. At the outermost side of the body portion 35 and major offset portion 37 is an upstanding end wall portion 40 which preferably extends upwardly to the plane of the upper edge of the body portion 35 and parallels the line of draft. It additionally functions as a brace for the plow portions 35 and 37.

It is preferred to attach the plow D to the frame C by welding and brace it by disposing a vertically-extending brace 41 (as a rigid tubular member), at the juncture of the body portion 35 with one each of an adjacent upper and lower side frame member 20 and 21 to which it is preferred to weld it and also weld the wall portion 40 to these side frame members as well as weld the other (opposite) side frame members 20 and 21 to the adjacent part of the body portion 35. Since the plow body portion 35 will encounter considerable unearthed debris (severed roots, stumps, etc.) it is constructed higher than the average plow body portion. This debris will, of course, travel along the plow body portion 35 toward the right of the line of draft. It will be noted in Fig. 1 that there is a depending section 42 to the wall portion 40.

The cutting mechanism or means E, which also provides the feeler means, comprises a plurality of preferably closely spaced apart, horizontally-disposed elongated, reciprocating members 45, shown particularly in vertical section in Figure 6 and in top plan in Fig. 2. There is a forward combined blade and feeler portion 46 and a longitudinally-slotted intermediate portion 47 extending rearwardly therefrom and, rearwardly of the juncture of the portion 46 and its associated portion 47, the latter is narrowed transversely, so that, when the reciprocating members are assembled, spaces 48 separate these narrowed portions, one from another, and spaces 49 are provided outwardly of the two outermost narrowed portions, all for a purpose later detailed. It is preferred to form the portions 46 of high carbon steel and these portions may be welded to their associated portion 47. The slots 50 of the portions 47 open into the sides of these latter portions, for a purpose subsequently detailed. Rearwardly of each intermediate portion 47 is a rear end portion 51 provided with a vertically opening slot 52 with rounded end walls, for a purpose to be described. The walls of the slot 52 are preferably strengthened against wear, such as by a tool steel insert surrounding the walls of each slot 52.

Slidably supporting the plurality of reciprocating members 45 is a guide bracket 53 which extends transversely of the plow structure B, through the slots 50, may be a rigid steel plate, and secured at one end, as by welding, to the depending section 42, while it may be secured, at its other end to a reciprocating members side-thrust bearing member 54 to be next described.

Means which dually function to prevent lateral movement of the reciprocating members 45 and also provides support for one end of the bracket 53 is shown in Fig. 2 and comprises a side thrust bearing member 54 and means to secure it to a lower side frame member 21, as by welding. This member 54 includes a main body part 55, an offset portion 56 having a face 57 paralleling and closely adjacent the outermost edge of the forward portion 46 closest thereto and a second offset portion 58 which provides a face for welding to the lower edge of the lower side frame member 21 last referred to, and a face 59 paralleling and closely adjacent the outermost edge of the intermediate portion 47 closest thereto. Thus there are two spaced-apart bearing faces or surfaces 57 and 59. Spacer members 60 fixed to the upper surface of the guide are adapted to extend into the spaces 48 and 49 and aid in guiding the reciprocation of the members 45.

The means F for actuating the cutting mechanism E, includes a rocker assembly 65 having a plurality of downwardly-extending parallel, elongated arms 66 projecting into the slots 52 and downwardly beyond the lower faces of the rear end portions 51, where they are provided with lateral projections 67, such as pins, to prevent the arms 66 from becoming detached from the portions 51, yet the arms may rock within the slots and, as they abut either of the rounded end walls of the slots 52 they will cause reciprocation, in one or the other directions, of the members 45.

Each rocker assembly 65 also preferably includes a plurality of second elongated arms 68, each preferably forming a right angle with its associated arm 66, and extending from each arm 66 to each arm 68 is a brace member or third arm 69.

The arms 66 and 68 join a hub portion 70 so that each associated arm 66, 68 and 69 may be mounted, in spaced apart relationship on a rocker shaft 71 with suitable conventional spacers between hub portions and there may be provided conventional ports to receive lubricant for the hub portions. The shaft 71 is carried by the side panels 22.

Pivoted to the arms 66, below the braces 69 is one end of a plurality of forward links 72 which are pivotally connected at their other ends with a plurality of pairs of second or rearward links 73 and the other ends of the links 73 are pivotally connected with an elongated pivot member, as a tubular rod 74, carried by the panels 23. Each link 73 is provided with a plurality of axially aligning perforations 75 to receive suitable pivot pins 76 extending outwardly from an enlargement 77 (shown in Figure 4) slidable along the lower end portion of an upwardly-extending rod 78 with the upper end portion of each rod 78 pivoted to the brace or arm 69 adjacent its connection with the arm 68. Below the enlargements 77 there is a stop 79 upon each rod 78 which stops may be nuts to cooperate with screw threads upon the lower end portions of the rods 78, whereby the positions of the stops may be varied.

The rows of perforations 75 are disposed adjacent the connections of the links 72 and 73 and provide for varying the distance between the arms 69 and link 73 as is apparent from Figure 1, since the pivotal connections of links 72 and 73 is removable (that is, may be pins, screw-threaded at their end portions and provided with suitable nuts) whereby pairs of links 73 may be separated in order to position the pivot pins 76 in any of the aligning perforations 75.

The enlargements form abutments for one end each of expansion spiral springs 80 with the other ends adjustably held by adjustment nuts 81 carried by the screw-threaded upper portions of the rods 78.

The construction disclosed permits the links 72 and 73 and the rods 78 to very quickly take the various positions shown in Figures 1 and 9 to 13 inclusive. When the parts are in the positions shown in Figures 10, 11 and 12, the upper face or edge of the arms 68 engage the face 82 of elongated roller 83 eccentrically carried by a shaft 84 whereby the roller functions as a cam and the face 82 as a cam face to urge the arms 68 downwardly and consequently, the arms 66 start to swing to the left as viewed in Figures 1 and 9 to 13 inclusive. As the arms 68 are urged downwardly the springs 80 are contracted considerably (they become partly contracted as the links took the positions shown in Figures 10, 11 and 12) and when the arms 68 have urged the rods 78 downwardly to the limit of the rod 78 shown in Fig. 12, the springs 80 will cause the links 72 and 73 to spring to their positions as in Fig. 13, urging the blades 46 of the reciprocating members 45 forward with cutting force, and the upper faces or edges of the arms 68 will simultaneously move out of the paths of the roller 83 to take the positions shown in Figures 1, 9 and 13, and remain out of these roller paths until the blades 46 (which are now functioning as feelers) contact an obstruction. Obviously, an obstruction may be met immediately after the parts take their positions as in Figure 9. This may be an obstruction represented by a partly severed root or stump or may be a wholly unsevered root or stump. Since the plow is moving forward during severing operations, it is obvious that if an obstruction is not severed nor broken up completely at one stroke, the forward movement of the plow will cause the blades 46 to function as feelers and, at the completion of their forward strokes, they will be forced backwardly by the obstruction and the forward movement of the plow which will then cause the rocker assembly 65 to rock, swinging the arms 66 rearwardly and the arms 67 upwardly, carrying the links with them until the arms 68 contact the face 82 of the roller 83, whereupon continued rotation of the roller will cause another forward cutting operation of the cutting mechanism E.

The shaft 84 of the roller 83 is fixed to a pulley 85 around which the belt 16 extends and the shaft 84 also carries a flywheel 86 in order to counteract variable torque.

Figure 10:
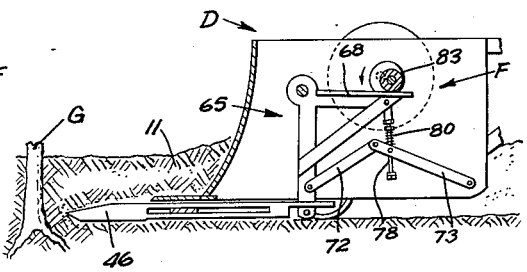
Figure 11:
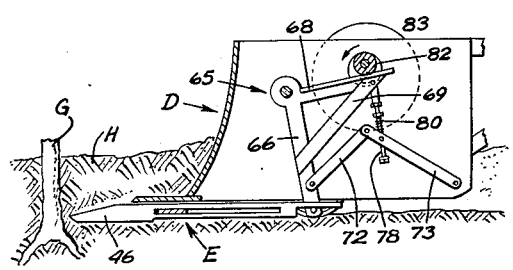
Figure 12:
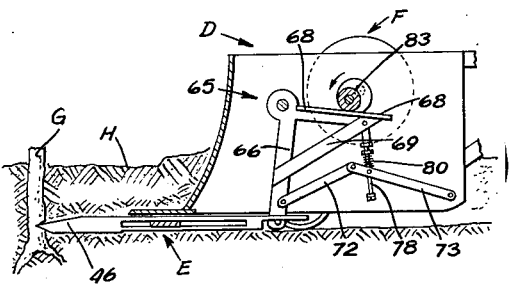
Figure 13:
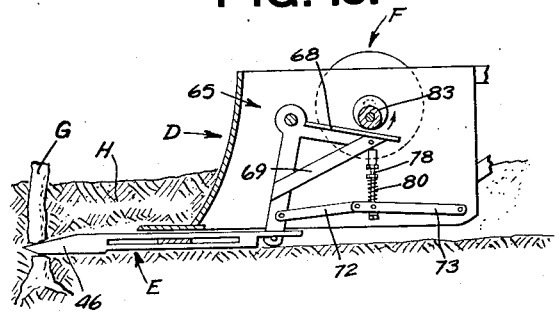
Figure 7:
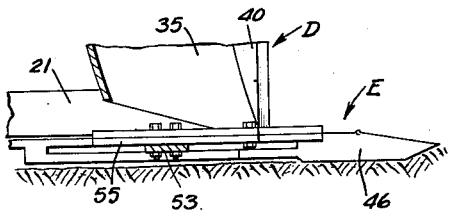
Figure 7 is a fragmentary view, mostly in elevation and partly in section, of this forward portion, substantially on the line 7—7 of Figure 1.
Figure 8:
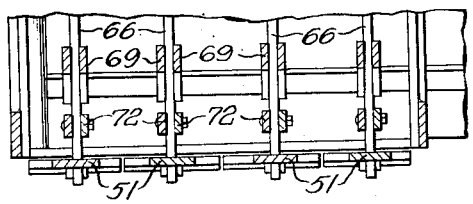
Figure 8 is a fragmentary vertical section, substantially on the line 8—8 of Figure 2.

Figures 1 and 9 show the positions of the several parts of the new plow structure while the plow D is travelling partly beneath the ground H. In Figure 9 the cutting mechanism E is not in operation but the roller 83 is rotating. In Fig. 10 the portion 46, functioning as a feeler, has encountered an obstruction G. The forward movement of the plow structure thereupon causes the cutting mechanism E to move to the right rocking the rocker assembly 65 to the right until the parts take the positions shown in Fig. 11 but, immediately, the cam face 82 of the rotating roller 83 causes the parts to move the positions shown in Figure 12 (or even to positions where the obstruction G is completely cut through). If it is not completely severed by the portions 46 which secondly function as cutting blades, then the portions 46 again become feelers, come into operation again and cause repositioning of the parts as in Figure 11 but, immediately the cam face 82 again causes the parts to resume their positions as in Figures 9 or 13 and the erstwhile feeler portions 46 again function as blades to complete severance of the obstruction G.

When severed, the debris of the obstruction G travels longitudinally along the plow offset portions 37 and 36 to the surface of the ground H. The wall portion 40 of course prevents such debris from moving in the opposite direction. Not only does this wall portion 40 thus provide a barrier but it also functions as a brace for the rest of the plow D.

Various changes may be made to the form of the invention herein shown and described without departing from the spirit of the invention or scope of the claims.

What is claimed is:

1. In an obstruction cutting plow, a frame, a plow carried by the frame, automatically reciprocable obstruction-feeler and obstruction-cutting means carried by the frame, and having obstruction-encountering parts extending outwardly of the plow, each of said parts comprising a reciprocating combined blade and feeler portion, and means to cause cutting operations by said combined blade and feeler portion only when the latter encounters an obstruction, including a rocker assembly operatively connected with said combined blade and feeler portion.

2. In an obstruction cutting plow, a frame, a plow carried by the frame, automatically movable obstruction-feeler and obstruction-cutting means carried by the frame, and having parts extending outwardly of the plow, each of said parts comprising a combined blade and feeler portion and a rear end portion, and means to cause cutting operations by said combined blade and feeler portion only when the latter encounters an obstruction, including a cam and a rocker assembly, with said rocker assembly having one arm movably connected with said rear end portion and a second arm disposed, when said combined blade and feeler portion is in one position, in the path of travel of said cam and disposed, when said combined blade and feeler portion is in another position, out of the path of travel of said cam.

3. In an obstruction cutting plow, a frame, a plow carried by the frame, automatically reciprocable obstruction-feeler and obstruction-cutting means carried by the frame, and having parts extending outwardly of the plow, each of said parts comprising a combined reciprocable blade and feeler portion and a reciprocable rear end portion, and means to cause cutting operations by said combined blade and feeler portion only when the latter encounters an obstruction, including a cam and a rocker assembly, with said rocker assembly having one arm movably connected with said rear end portion and a second arm disposed, when said combined blade and feeler portion is in a fully extended position, out of the path of travel of said cam and disposed, when said combined blade and feeler portion is in a retracted position within the path of travel of said cam.

4. In an obstruction cutting plow, a frame, a plow carried by the frame, automatically reciprocable obstruction-feeler and obstruction-cutting means carried by the frame, including an elongated reciprocating member having a blade and feeler portion, an intermediate portion provided with a horizontally-extending slot and a rear portion, a guide bracket extending through said slot and fixedly carried partly by said plow, and means to cause cutting operations of said blade and feeler portion when the latter encounters an obstruction including a cam, an oscillating arm movably connected with said rear portion and an oscillating arm connected with the first arm and movable therewith into the path of travel of said cam when said blade and feeler portion encounters an obstruction.

5. In an obstruction cutting plow, a frame, a plow carried by the frame, automatically reciprocable obstruction-feeler and obstruction-cutting means carried by the frame, including an elongated reciprocating member having a blade and feeler portion, an intermediate portion provided with a horizontally-extending slot and a rear portion, means to limit side thrust of said elongated reciprocating member, including a rigid body portion with a face paralleling reciprocating member and closely adjacent thereto, a guide bracket extending through said slot and fixedly carried partly by said plow and partly by said body portion, and means to cause cutting operations of said blade and feeler portion when the latter encounters an obstruction including a cam, an oscillating arm movably connected with said rear portion and an oscillating arm connected with the first arm and movable therewith into the path of travel of said cam when said blade and feeler portion encounters an obstruction.

6. In an obstruction cutting plow, a frame, a plow carried by the frame, including a main upwardly-extending portion, an offset portion inclined forwardly from the lower end of the main portion, and an upstanding end wall portion joining the main and offset portions and having a section depending below the plane of the offset portions, automatically reciprocable obstruction-feeler and obstruction-cutting means carried by said frame, including an elongated horizontally reciprocating member having a blade and feeler forward portion, an intermediate portion provided with a slot, and a rear portion, means to limit side thrust of said elongated reciprocating member including a rigid body portion with a face paralleling reciprocating member and closely adjacent thereto, a horizontally-disposed guide bracket extending through said slot and beneath said offset portion and secured at one end to said section and secured at its other end to said rigid body portion, and means to cause cutting operations of said blade and feeler portion when the latter encounters an obstruction including a cam, an oscillating arm movably connected with said rear portion and an oscillating arm connected with the first arm and movable therewith into the path of travel of said cam when said blade and feeler portion encounters an obstruction.

7. In an obstruction cutting plow, a frame, a plow carried by the frame, automatically reciprocable obstruction-feeler and obstruction-cutting means carried by the frame, and having parts extending outwardly of the plow, and means to cause cutting operations by said parts only when said parts encounter an obstruction, including a rotating member having a cam face and a rocker assembly comprising an arm movable upon reciprocation of said first means and a second arm rigid with the first arm and disposed in the path of travel of said cam face when said first means encounters an obstruction and disposed out of the path of travel of said cam face when said first means does not encounter an obstruction.

8. In an obstruction cutting plow, a frame, a plow carried by the frame, automatically reciprocable obstruction-feeler and obstruction-cutting means carried by the frame, and having parts extending outwardly of the plows, and means to cause cutting operations by said parts only when said parts encounter an obstruction, including a rotating member having a cam face, a rocker assembly comprising an arm movable upon reciprocation of said first means and a second arm rigid with the first arm and disposed in the path of travel of said cam face when said first means encounters an obstruction and disposed out of the path of travel of said cam face when said first means does not encounter an obstruction, and quick-acting means to assist movement of said rocker assembly to move said second arm as aforesaid.

9. In an obstruction cutting plow, a frame, a plow carried by the frame, automatically reciprocable obstruction-feeler and obstruction-cutting means carried by the frame, and having parts extending outwardly of the plows, and means to cause cutting operations by said parts only when said parts encounter an obstruction, including a rotating member having a cam face, a rocker assembly comprising an arm movable upon reciprocation of said first means and a second arm rigid with the first arm and disposed in the path of travel of said cam face when said first means encounters an obstruction and disposed out of the path of travel of said cam face when said first means does not encounter an obstruction, and quick-acting means to assist movement of said rocker assembly to move said second arm as aforesaid, including a pair of links, one pivotally carried at one end by said first arm and pivotally connected with the other link at its other end, with the second link pivotally connected with said frame, a rod pivotally carried by said second arm and depending therefrom, an enlargement slidable along said rod and pivotally connected with said second link adjacent the pivotal connection connecting the two links together, a stop below said enlargement and carried by said rod, a stop spaced above said enlargement, and an expansion spiral spring about said rod, bearing against the upper end of the enlargement and against the lower end of the stop.

CHARLES WENDELL JENNINGS.

REFERENCES CITED

The following references are of record in the file of this patent:

UNITED STATES PATENTS

| Number | Name | Date |
|---|---|---|
| 1,371,064 | Agneni | Mar. 8, 1921 |